(12) United States Patent
Mazumder et al.

(10) Patent No.: US 8,164,022 B2
(45) Date of Patent: Apr. 24, 2012

(54) OPTICAL SENSOR FOR QUALITY MONITORING OF A WELDING PROCESS

(75) Inventors: Jyoti Mazumder, Ann Arbor, MI (US); Ashish K. Dasgupta, Troy, MI (US); Mikhail Vasilyev, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 856 days.

(21) Appl. No.: 11/951,997

(22) Filed: Dec. 6, 2007

(65) Prior Publication Data

US 2008/0210674 A1 Sep. 4, 2008

Related U.S. Application Data

(60) Provisional application No. 60/873,112, filed on Dec. 6, 2006.

(51) Int. Cl.
*B23K 26/20* (2006.01)
*B23K 26/32* (2006.01)

(52) U.S. Cl. ............ 219/121.64; 219/121.45

(58) Field of Classification Search ......... 219/121.63, 219/121.64, 121.83, 121.13, 121.14, 121.45, 219/121.46, 130.21, 137 R
See application file for complete search history.

(56) References Cited

U.S. PATENT DOCUMENTS

| | | | |
|---|---|---|---|
| 5,026,979 A | 6/1991 | Ortiz, Jr. et al. | |
| 5,245,682 A * | 9/1993 | Ortiz, Jr. ............... | 385/33 |
| 5,304,774 A * | 4/1994 | Durheim ............ | 219/121.83 |
| 6,060,685 A * | 5/2000 | Chou et al. ........... | 219/121.83 |
| 6,188,041 B1 * | 2/2001 | Kim et al. ............ | 219/121.63 |
| 6,710,283 B2 * | 3/2004 | Mori et al. ........... | 219/121.64 |
| 2005/0011867 A1 * | 1/2005 | Okuda et al. ........ | 219/121.63 |
| 2008/0035615 A1 * | 2/2008 | Li et al. ................ | 219/121.63 |

FOREIGN PATENT DOCUMENTS

| | | | |
|---|---|---|---|
| CA | 2014366 A1 * | 10/1990 | |
| EP | 0350942 | 1/1990 | |
| EP | 1238744 | 9/2002 | |
| JP | 1-241391 A * | 9/1989 | |
| JP | 02195234 | 8/1990 | |
| JP | 5-77074 A * | 3/1993 | |
| WO | WO-93-03881 A1 * | 3/1993 | |
| WO | WO-00/41836 | 7/2000 | |

OTHER PUBLICATIONS

Ferrara et al., "On-line quality monitoring of welding processes by means of plasma optical spectroscopy", Dec. 2000, Proceedings of SPIE, vol. 3888, pp. 750-758.*

(Continued)

*Primary Examiner* — Geoffrey S Evans
(74) *Attorney, Agent, or Firm* — Rader, Fishman & Grauer PLLC

(57) ABSTRACT

Disclosed is the design and working principle of a welding monitoring system that can monitor the spectra of zinc and iron in the plasma generated during a welding process involving zinc-coated steel. The monitoring system is capable of monitoring multiple parameters, including spectral line intensity, electron temperature, and ratio of zinc and iron composition in the plasma. The results can then be used individually or in combination to predict resulting weld quality and generate appropriate feedback control signals.

19 Claims, 4 Drawing Sheets

OTHER PUBLICATIONS

Schellhorn et al., "Spectroscopic investigations of CO and CO2 laser induced aluminum welding plasmas", Dec. 2000, SPIE vol. 3092, pp. 522-525.*

Bruncko et al., "Monitoring of Laser Welding by Optical Emission Spectroscopy", Dec. 2003, Laser Physics, vol. 13, No. 4, pp. 669-673.*

Aalderink et al., "Weld Plume Emissions During Nd:YAG Laser Welding", Jun. 2005, Proceedings of the Third International WLT-Conference on Lasers in Manufacturing, pp. 1-5.*

Mirapeix et al., "Fast algorithm for spectral processing with application to on-line welding quality assurance", Aug. 2006, Institute of Physics Publishing, vol. 17, pp. 2623-2629.*

International Search Report for PCT/US2007/086657.

* cited by examiner

OPTICAL SENSOR FOR QUALITY MONITORING OF A WELDING PROCESS

CROSS REFERENCE TO RELATED APPLICATIONS

This application claims priority to U.S. Provisional Patent Application 60/873,112, filed Dec. 6, 2006, the disclosure of which is hereby incorporated by reference in its entirety.

This application was made with government support under EEC0438917 awarded by the National Science Foundation. The government has certain rights in the invention.

BACKGROUND

Many industries, including the automotive industry, use zinc-coated steel materials to form various structures, including automobile frames and bodies. Creating such structures typically requires using one or more types of welding. While zinc provides excellent corrosion resistance to steel, zinc can also cause difficulties during welding.

During fusion welding, for example, explosive zinc vapor can form and cause undesirable spattering of the weld metal, as well as extensive porosity in the weld after solidification. In other words, there is a relation between the quality of a weld, and the amount of vaporized zinc present during the welding process. The issue of porosity is more significant in certain types of welds, such as lap welds, which are a preferred welding method for automotive body fabrication. Thus, the scrap rate in this type of welding process is typically higher, forcing manufacturers to incur material losses to maintain certain quality standards. Manufacturers that weld zinc-coated steel materials would benefit from improved welding techniques and in-process quality control methods.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present inventive concepts. Further, the embodiments set forth herein are not intended to be exhaustive or otherwise limit or restrict the claims to the precise forms and configurations shown in the drawings and disclosed in the following detailed description. In addition, where the drawings show calculations, graphs, or data plots, such graphical representations are simply illustrative of the present inventive concepts and not intended to be exact representations.

DETAILED DESCRIPTION

Figure 1:
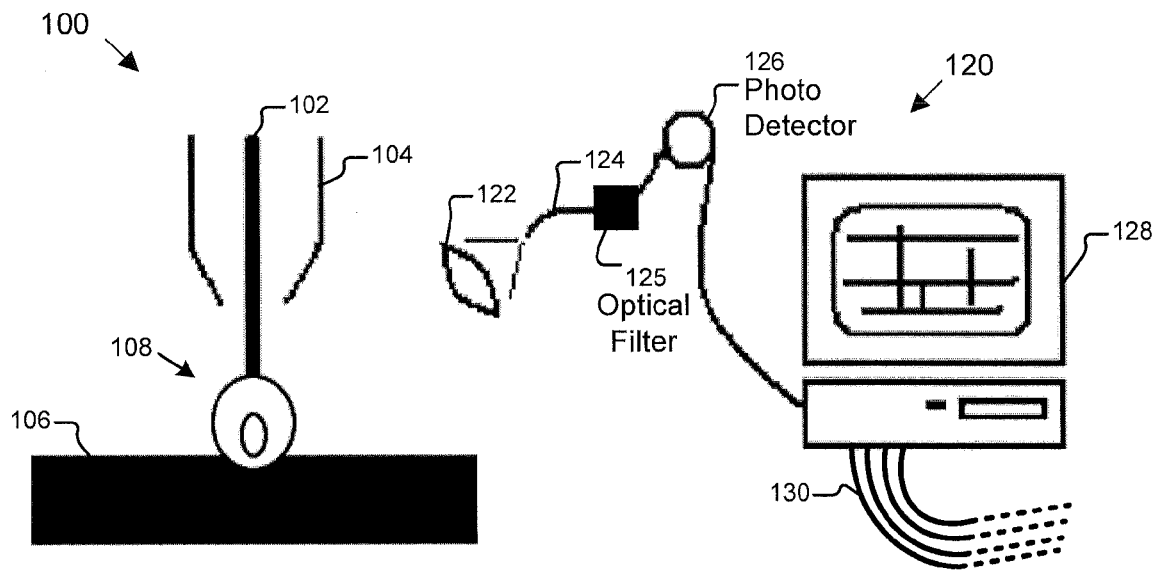
FIG. 1 is a schematic of an optical sensor for monitoring a welding process.

FIG. 1 illustrates a schematic of an optical sensor for monitoring a welding process, which includes a welding system 100, and a monitoring system 120. Welding system 100 is a laser welding system, as is known, although welding system 100 may be any fusion welding system capable of performing a welding operation, such as welding zinc-coated steel materials. Welding system 100 commonly includes a laser beam 102, a nozzle 104, a weld material 106, and a plasma plume emission 108. Welding system 100 typically joins multiple pieces of weld material 106 together using heat from laser beam 102, as is known. Weld material 106 is commonly a metal, such as steel. Certain weld materials 106, such as zinc-coated steel, pose additional welding challenges due to the presence of additional materials, such as zinc. For example, during a welding process, zinc can boil and create porous welds that can fail to meet certain regulatory or safety standards. Although the following description references welding zinc-coated steel, the disclosed system and methods may be used with any weld material 106 where multiple materials or elements are present.

Generally, monitoring system 120 monitors the materials present in plasma plume 108 to determine whether the weld will meet certain specifications. Monitoring system 120 calculates the ratio of materials present in plasma plume 108, such as the ratio of iron to zinc, by measuring and plotting various attributes of plasma plume 108, such as one or more spectral line intensities and electron temperatures, as will be discussed in greater detail below. Monitoring system 120 can compare current measured values against previously recorded benchmarks, and determine whether the current welding process will produce a weld that is within previously determined quality limits. Further, monitoring system 120 can also provide feedback to welding system 100 to alter one or more welding parameters to correct any perceived welding issues during a welding process. Monitoring system 120 generally includes a focusing lens 122, a fiber-optic cable 124, a photo detector 126, a computer 128, and one or more feedback loops 130.

Focusing lens 122 is generally an optical focusing lens or a tunable collimator that is capable of gathering light from plume emission 108. For example, focusing lens 122 may be an HPUCO-25-380-M-50PQ-SP with an SMA connector made by Oz Optics of Ottawa, Ontario, Canada, or an optics 84-series lens fixture with SMA connector made by Ocean Optics of Dunedin, Fla., or any fiber collimator made by Thorlabs of Newton, N.J. Generally, focusing lens 122 is connected to one or more photo detectors 126 by fiber-optic cable 124. Fiber-optic cable 124 can be any optical fiber capable of delivering the collected light from plume emission 108 to photo detector 126, such as any single/splitted optical fiber assembly made by Thorlabs or Ocean Optics. Fiber-optic cable may have a core diameter of 50 μm and a range of 190-800 nm (UV/SR-VIS).

Photo detector 126 is generally one or more ultra-violet and visible light photo detectors, possibly with an integrated amplifier, that converts the received light spectra into electrical signals. For example, photo detector 126 may be a high-speed fiber optic detector made by Thorlabs. Photo detector 126 may have a bandwidth of up to or greater than approximately 8 GHz, although the precise bandwidth may depend on the particular application. Photo detector 126 may also be preceded by an optical filter 125. Optical filter 125 may receive light from focusing lens 122 and filter the received light spectrum such that only desired light wavelengths are passed on to photo detector 126. Optical filter 125 may be any custom line filter made by Newport Oriel Instruments of Irvine, Calif., or any custom line filter or optic filter holder made by Ocean Optics. Generally, the desired light wavelengths correspond to the particular elements or materials of interest found in plasma plume 108, generally including weld material 106. In a welding processing where weld material 106 is zinc-coated steel, the desired light wavelengths generally correspond to zinc, iron, or both, as discussed in greater detail with reference to Table 1.

Generally, to properly capture the proper wavelengths using monitoring system 120, focusing lens 122 is generally positioned near plasma plume 108, generally within a range of approximately two inches to several meters, although the precise distance may vary by application and by the particular focusing lens 122. Generally, focusing lens 122 is placed far enough away from plasma plume 108 to prevent heat damage to the device, but is placed close enough to properly capture the desired light spectrum from plasma plume 108, within the general operational limits of the particular focusing lens 122. Welding system 100 may utilize a fixed or stationary laser beam 102, allowing focusing lens 122 to be placed in a fixed position near plasma plume 108. However, welding system 100 may utilize a moveable laser beam 102 that can travel along weld material 106. In such a system, focusing lens 122 may be fixed or attached to a device, robotic arm, laser beam emitter, or some other object that will travel along with the moveable laser beam 102. Generally, focusing lens 122 should remain at a fixed distance to plasma plume 108 during a welding operation to ensure consistent data that is ultimately provided to computer 128.

Computer 128 may be any computing device that includes a processor, a memory, and is capable of receiving and analyzing data from focusing lens 122 and/or photo detector 126. Computer 128 may include hardware and software analyzing the light spectrum emanating from plasma plume 108. Generally, computer 128 receives data from plasma plume 108, generally through focusing lens 122, optical filter 125, and photo detector 126, Computer 128 can then analyze such data, and may then provide a feedback signal to welding system 100 over one or more feedback loops 130. For example, in a laser welding system 100, feedback loops 130 may be connected to welding system 100 and used to alter one or more welding parameters, including power, welding speed, shielding gas flow rate, or any other controllable parameter of welding system 100. Altering such welding parameters may be done in real-time during a welding process of the current welding material, or altering such parameters may be applied prospectively to later welding processes. Computer 128 generally includes hardware and software for receiving and analyzing data in accordance with the disclosed theory of operation, as described in detail below.

Theory of Operation

Molten pool geometry, pool temperature, and plasma/plume are the physical parameters that can be monitored during a welding process involving welding system 100. Generally, such parameters can be monitored using monitoring system 120 by monitoring plasma plume 108. These parameters are recognized to be a complicated nonlinear phenomenon relating to the independent parameters. The vaporized material, containing neutral atoms, ions, electrons, or the like, is known as a laser-produced plasma plume 108 and expands away from the melting pool surface. Physical parameters of plasma plume 108 can be correlated with the welding process very effectively.

Light emanating from plasma plume 108 is commonly referred to as a plasma plume spectrum. A plasma plume spectrum that is observed in the hottest region could be dominated by continuous, intense, broad-band radiation. Consequently, no discrete lines can be observed. The irradiation from other part of plume 108 can have resolved atomic emission lines, which are typically broadened to the Gauss or Doppler profile depending on neutrons, ions, and electrons interacting. The quality of a weld involving welding system 100 commonly depends on the plasma temperature and carrier concentration and has a strong correlation with the plasma plume spectrum. The parameters of plasma can be determined in several ways: from an intensity ratio of the ions or atoms emission lines; from a full width at half maximum (FWHM) of the line profile; or from a Boltzmann plot. The short wavelength part of a broad-band radiation spectrum also gives information about the temperature of plasma in plasma plume 108. Atomic spectral lines can also be used to determine the elemental composition or the elemental concentrations in the welded sample.

Based on plasma spectroscopy theory that supplements the disclosed system and methods, the following assumptions are made for spectroscopic analysis: optically thin plasma; local thermal equilibrium; and critical electron density. In Equation 1, $N_e$ represents electron density [cm$^{-3}$], $T_e$ represents electron temperature, and $\Delta E$ represents the largest energy gap in the atomic energy level system.

$$N_e \geq 1.6 \times 10^{12} T_e^{1/2} (\Delta E)^3 \qquad \text{Equation 1}$$

Simplified, the above assumptions show that the plasma produced during a welding process will have particles with Maxwellian energy distributions and collisional processes will dominate over radiative ones. Typical electron densities in a plasma plume over a metal surface, estimated under welding conditions, exceed the critical value by two orders of magnitude. So, there is a very low probability of not having local thermal equilibrium during welding.

When a charged specie in the plasma makes a transition from a higher energy state (m) to a lower energy state (n), the differential amount of energy is released in the form of light emanating from plasma plume 108 that can be detected and analyzed using monitoring system 120. The intensity of the plasma emission line associated with this transition is given by Equation 2, where $I_{mn}$ represents the intensity of transition, $N_m$ represents the population of the upper state (m), $A_{mn}$ represents the transition probability, and $h\nu_{mn}$ represents the energy of transition.

$$I_{mn} = N_m A_{mn} h\nu_{mn} \qquad \text{Equation 2}$$

The population of the excited state, (m), is given by the Boltzmann distribution as describe by Equation 3, where N represents the total density of the state, $g_m$ represents the degeneracy, Z represents the partition function, $E_m$ represents the upper state energy level, k represents the Boltzmann constant, and T represents the electron temperature.

$$N_m = \left(\frac{N}{Z}\right) g_m e^{-\left(\frac{E_m}{kT}\right)} \qquad \text{Equation 3}$$

Equation 4 represents the substitution of Equation 3 in Equation 2.

$$\ln\left(\frac{I_{mn}\lambda_{mn}}{A_{mn}g_m}\right) = \ln\left(\frac{Nhc}{Z}\right) - \frac{E_m}{kT} \qquad \text{Equation 4}$$

Monitoring system 120 is capable of monitoring and recording the intensities of such transitions, using focusing lens 122 and photo detector 126. Using such information, monitoring system 120 can then indicate the presence of unique atomic species in the plasma. For measuring electron temperature in real-time, either the Boltzmann plot method or an extension of this method can be used. The ratios of zinc and iron line intensities and electron temperatures are simply mathematical extensions of the above two data sets.

Figure 2:
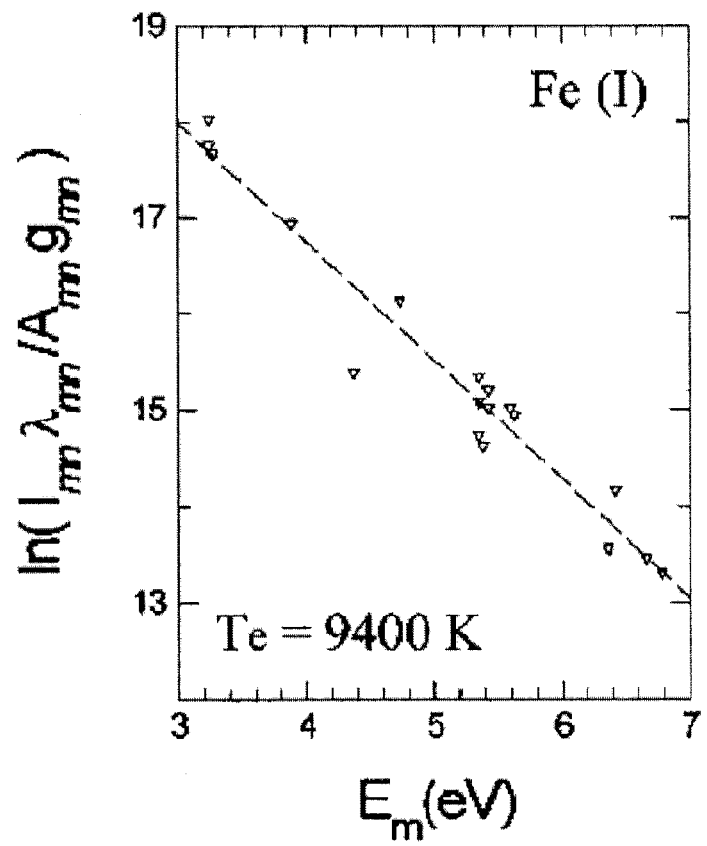
FIG. 2 is a graphical representation of a calculation of electron temperature by a Boltzmann plot method.

FIG. 2 illustrates a graphical representation a calculation of electron temperature by a Boltzmann plot method. By continuously plotting the first term of Equation 4 against $E_m$ for several transition lines, monitoring system 120 can estimate the electron temperature in real-time, which is related to the slope of the linear fit, as shown in FIG. 2. Each point in FIG. 2 comes from a single spectral line. By using more data points, the fitted line and the approximate slope can be better estimated. While a large number of points can give a better estimate of electron temperature, monitoring corresponding large number of spectral lines can be cumbersome and costly.

Another way to approximate the electron temperature of an element using the Boltzmann method is to select two spectral lines of that element which have considerably different upper state energy levels. This approach is like plotting two extreme points in FIG. 2, and then fitting a line through them. The considerable difference in energy levels (x-coordinate) of the two points reduces the amount of error in fitting the line and estimating its slope. In this approach, only two spectral lines of an element need to be monitored, hence it is also referred as the two-point Boltzmann method. The simplified equation for calculating electron temperature using two-point Boltzmann method is shown in Equation 5, where the numbers (1) and (2) denote two transition lines of a material.

$$T_e = \frac{E_m(2) - E_m(1)}{k \ln\left[\frac{I(1)A_{mn}(2)g_m(2)\lambda(1)}{I(2)A_{mn}(1)g_m(1)\lambda(2)}\right]} \quad \text{Equation 5}$$

The above method, however, poses a computational difficulty in some cases, particularly where the axis temperature of the plasma is critical and/or significantly different from the periphery. Unfortunately, most welding plasmas fall in this category. In other words, the two-point Boltzmann method calculates the electron temperature at the periphery of the radiating plasma. In order to calculate the axis or the core plasma temperature, a complex method, known as Abel's Inversion, must be used. To make the process simpler, a previously reported modified two-point Boltzmann method is used for analyzing welding plasmas. The corresponding modified electron temperature equation is shown in Equation 6.

$$T_e = \frac{E_m(2) - E_m(1)}{k \ln\left[\frac{E_m(1)I(1)A_{mn}(2)g_m(2)\lambda(1)}{E_m(2)I(2)A_{mn}(1)g_m(1)\lambda(2)}\right]} \quad \text{Equation 6}$$

Depending on the application, monitoring system 120 can include computer readable instructions for monitoring electron temperatures using any of the above mentioned methods. After reviewing an atomic transitional probability database, such as one provided by the National Institute of Science and Technology (NIST) of Gaithersburg, Md., suitable lines for monitoring zinc and iron in the plasma were identified. Table 1 shows the set of lines and the properties that can be used for intensity and electron temperature measurements.

TABLE 1

Zinc and Iron lines suitable for monitoring weld quality

|  | $\lambda_{mn}$ (nm) | $E_m$ (eV) | $g_m$ | $A_{mn} \times 10^8$ (s$^{-1}$) |
|---|---|---|---|---|
| Zn I | 328.233 | 7.782859 | 3 | 0.8657 |
|  | 330.258 | 7.783265 | 5 | 1.072 |
|  | 334.502 | 7.783880 | 7 | 1.5 |
|  | 468.014 | 6.654963 | 3 | 0.1553 |
|  | 472.215 | 6.654963 | 3 | 0.4576 |
|  | 481.052 | 6.654963 | 3 | 0.7004 |
| Fe I | 382.588 | 4.154353 | 7 | 0.598 |
|  | 385.991 | 3.211188 | 9 | 0.097 |
|  | 426.047 | 5.30853 | 7 | 0.63112 |
|  | 427.176 | 4.3865 | 11 | 0.22466 |

Once the intensity and electron temperature profiles of zinc and iron are available, they can be combined to obtain a profile of their relative composition in plasma by taking ratios. So, if the ratio of iron to zinc is plotted, a lower value will suggest higher zinc concentration in the plasma and vice versa.

By conducting a design of experiment, parameters for producing best welds can be identified for zinc-coated steel. The best welds, or in other words, welds with optimal properties, can then be used for comparison in a given processing parameter domain. First, using monitoring system 120, all three data sets mentioned above, including line intensity, electron temperature and the ratio of iron and zinc in plasma, can be recorded. These data sets can then be statistically processed (means and standard deviations) and used as benchmarks for testing quality of actual production welds. In other words, the deviations in recorded statistics of the actual welds from the best weld can be used to predict in-process weld quality. Generally, in order to use monitoring system 120 to monitor and improve overall weld quality, a series of quality benchmarks are typically established prior to use in a production environment.

Figure 3:
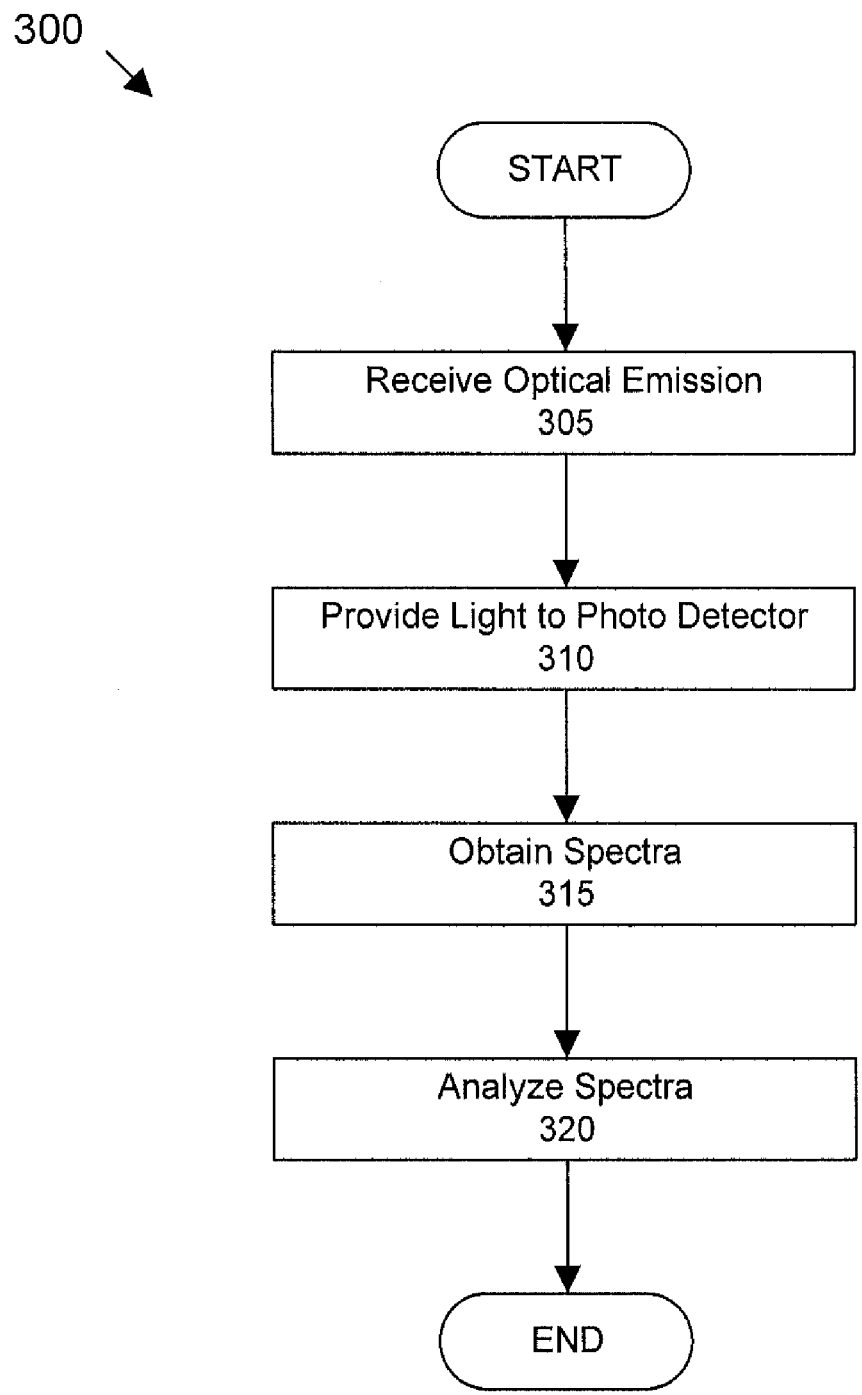
FIG. 3 illustrates an exemplary process 300 for analyzing a light spectrum of a plasma plume.

FIG. 3 illustrates an exemplary process 300 for analyzing a light spectrum in plasma plume 108. Process 300 begins in step 305 when monitoring system 120 receives optical emission. Generally, optical emission from plasma plume 108 is collected using focusing lens 122. Focusing lens 122 can be either an optical focusing lens, or a tunable collimator depending on the working distance (distance between plasma source and lens/collimator) and required flexibility. A fiber-coupled tunable collimator assembly may be used for production environments.

Next, in step 310, light is provided to photo detector 126. Once the light is available from focusing lens 122, the light is then provided to one or more photo detectors 126 for further processing. Generally, the light is provided from focusing lens 122 to photo detector 126 by fiber-optic cable 124.

Next, in step 315, a spectra is obtained. Monitoring system 120 includes ultra-violet and visible light photo detectors 126, which may also include integrated amplifiers. Photo detectors 126 may be preceded by optical filters which transmit only the desired wavelengths, generally corresponding to zinc and/or iron for an application involving weld material 106 of zinc-coated steel. The spectral region of interest may be the one as shown in Table 1 or any other pertinent region in the entire light spectrum. As such, the number of optical filters and photo detectors may vary depending upon the application.

Next, in step 320, the spectra are analyzed using computer 128. Photo detectors 126 selectively measure the intensity of zinc and/or iron lines during a welding process. The values of those intensities are continuously recorded using computer 128 using any suitable I/O board and software. The real-time intensities of zinc and iron lines are used to compute electron temperature of zinc and iron as above. If needed, the ratios of intensities and electron temperatures of iron and zinc lines are also computed using computer 128.

Following step 320, statistical means and standard deviations of all data sets are computed. Since all these computations are done by computer 128 during a welding process, the results can be displayed as plots of quality parameters between acceptable control limits. As mentioned earlier, the control limits of quality parameters are first obtained from good/acceptable welding benchmarks, generally made with optimal welding parameters. During production, these control limits can be used to predict the quality of welds made.

As an example, consider a benchmark of an optimal weld repeatedly showed mean values of iron intensity Fe(I), zinc intensity Zn(I), iron electron temperature Fe(ET), zinc electron temperature Zn(ET), and ratios Fe(I)/Zn(I) and Fe(FT)/Zn(ET) as 5000, 1000, 15000 K, 5500 K, 5 and 2.72 respectively. Now, the presence of excessive zinc vapor at any point during welding will increase the optical emission of zinc, which will be instantaneously recorded by monitoring system 120. If this measured intensity and electron temperature of zinc is found to be higher, and the Fe/Zn ratios lower than the optimal weld values listed above, monitoring system 120 can immediately report that there is likely a problem in the weld.

Additionally, other factors such as bead separation, gaps between welds, and welding system variations (e.g., laser power, gas flow, etc.) which are very commonly observed on production systems may also affect the plasma emission. Such variations can also be captured by monitoring system 120. For example, feedback loops 130 may be configured to conduct bi-directional communication with another computer, such as a computer that is configured to control and monitor various system parameters of welding system 100.

Figure 4:
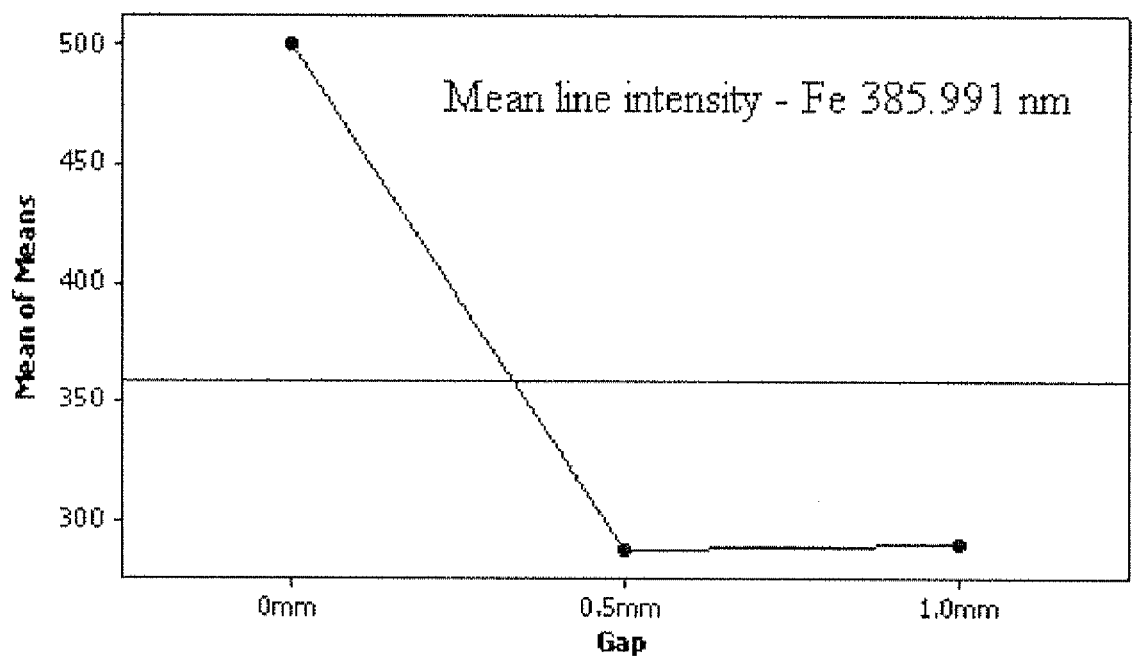
FIG. 4 is a graphical representation of a mean line intensity of Fe (385.991 nm) that reduces sharply with any gap/bead separation.
Figure 5:
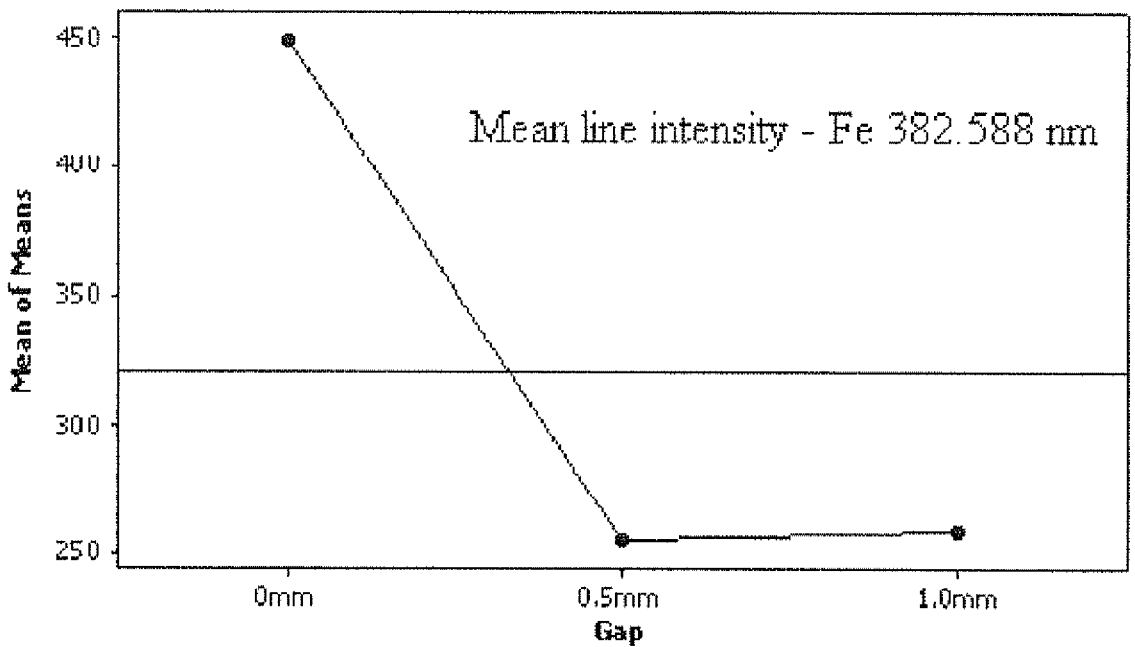
FIG. 5 is a graphical representation of a mean line intensity of Fe (382.588 nm) that reduces sharply with any gap/bead separation.

FIGS. 4 and 5 illustrate a distinguishable difference in recorded mean emission intensities of iron when a gap was intentionally created for welding. For example, FIGS. 4 and 5 illustrate that any gap/bead-separation during a welding process reduces the mean iron line intensity significantly. Monitoring system 120 may record such information, so that in the future, monitoring system 120 can detect such a decrease in intensity and can immediately report a defect, and also map the location of the defect on the weld.

Figure 6:
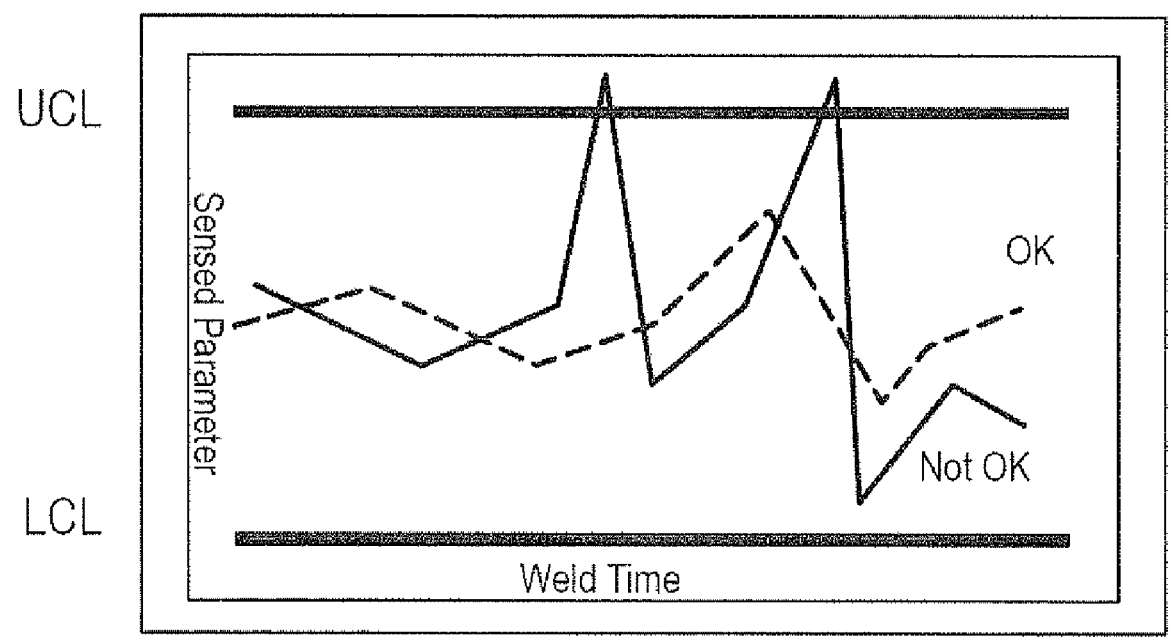
FIG. 6 is a graphical representation of an output from a monitoring system.

FIG. 6 is a graphical representation of an output from monitoring system 120. FIG. 6 illustrates one example, where monitoring system 120 provides a simplistic weld screening graph showing that a weld is either OK or not OK. Generally, an OK weld indicates that the analyzed spectra shows that the weld meets previously set specifications, as indicated by the previously taken benchmarks. In turn, a weld that is Not OK, generally fails to meet the stated weld specifications. Such an output may be presented in real-time based on the upper (UCL) and lower (LCL) control limits of quality parameters (mean and/or standard deviation of line intensity, electron temperature or Fe/Zn ratios) established from good/acceptable welds.

Monitoring system 120 can also be integrated with a suitable feedback controller for providing a feedback signal to control a welding parameter. For example, monitoring system 120, through feedback loops 130, can provide a signal to alter various welding parameters, including power, welding speed, shielding gas flow rate, etc. Such weld parameters can then be altered during the process to obtain best weld quality.

Computer 128 may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX YNIX operating system distributed by International Business Machines of Armonk, N.Y.; and the Linux operating system. Further, computer 128 is capable of executing instructions stored on a computer readable medium. Computer-executable instructions may be compiled or interpreted from computer programs created using a variety of known programming languages and/or technologies, including, without limitation, and either alone or in combination, Java, C, C++, Visual Basic, Java Script, Pert, etc. In general, a processor receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A system, comprising:
  a focusing lens configured to receive a multi-directional light spectrum from a plasma plume of a fusion welding process;

a photo detector operatively coupled to the focusing lens, the photo detector is configured to detect at least one of a visible and a non-visible multi-directional light;

a computer configured to selectively receive a signal from the photo detector, measure a spectral line intensity of at least one element and an electron temperature of at least one element from the plasma plume, wherein the at least one element is one of a zinc element and an iron element, and wherein the computer is further configured to calculate a ratio of the spectral line intensity of the zinc element of interest in the plasma plume with a spectral line intensity of the iron element of interest in the plasma plume; and a feedback control loop operatively coupled to the computer and configured to provide a feedback signal to the system in order to alter a real-time welding parameter to meet a set of pre-determined quality standards as compared to the calculated ratio of spectral line intensity.

2. The system of claim 1, further comprising an optical filter interposed between the focusing lens and the photo detector and configured to selectively filter the received light spectrum and provide a spectral region of interest to the photo detector.

3. The system of claim 2, wherein the spectral region of interest includes an approximate wavelength corresponding to the elements of interest in the plasma plume.

4. The system of claim 2, wherein the spectral region of interest includes a first region corresponding to the zinc element, and a second region corresponding to the iron element.

5. The system of claim 1, wherein the focusing lens is a tunable collimator positioned approximately between two inches and nine feet away from the plasma plume.

6. The system of claim 1, further comprising a feedback control loop operatively coupled to the computer and configured to provide a feedback control signal to a fusion welding system in order to alter a welding parameter.

7. The system of claim 1, further comprising a plurality of photo detectors connected to the focusing lens by an optical fiber cable.

8. The system of claim 1, wherein the computer is further configured to calculate a ratio of the electron temperature of the zinc element to the electron temperature of the iron element.

9. The system of claim 1, wherein the computer is further configured to calculate an approximate ratio of the zinc element to the iron element in the plasma plume of the fusion welding process based on the measured spectral line intensity and the electron temperature.

10. The system of claim 1, wherein the computer is further configured to determine whether a fusion welding process is likely to produce a weld of acceptable quality based on a benchmark.

11. The system of claim 1, wherein the computer is further configured to provide an alert if a weld currently in-process is not likely meet a pre-determined quality specification.

12. A method, comprising:

receiving a non-visible and visible light spectrum emanating from a plasma plume of a fusion welding process;

filtering the received non-visible and visible light spectrum to obtain a spectra of interest;

measuring a spectral line intensity and an electron temperature from the spectra of interest in the plasma plume;

calculating a ratio of the spectral line intensity of a first element of interest in the plasma plume with a spectral line intensity of a second element of interest in the plasma plume;

analyzing the spectra of interest to determine whether the fusion welding process is likely to produce a weld that meets a pre-determined quality specification having an upper control limit and a lower control limit;

adjusting at least one real time weld parameter to meet the pre-determined quality specification as compared to the calculated ratio; and wherein the spectra of interest includes a first region corresponding to zinc, and a second region corresponding to iron.

13. The method of claim 12, further comprising establishing the pre-determined quality specification from the measuring of the spectral line intensity and the electron temperature, and a benchmark welding process.

14. The method of claim 12, wherein the spectra of interest includes an approximate wavelength corresponding to the elements of interest in the plasma plume.

15. The method of claim 12, wherein the spectra of interest includes wavelengths from approximately 200 nanometers to approximately 1000 nanometers.

16. The method of claim 12, wherein the spectra of interest includes wavelengths from approximately 300 nanometers to approximately 500 nanometers.

17. The system of claim 12, further comprising calculating a ratio of the electron temperature of the first element to the electron temperature of the second element.

18. The method of claim 12, further comprising providing an alert if a weld currently in-process is not likely to meet the pre-determined quality specification.

19. An in-process weld quality monitoring system, comprising:

a focusing lens configured to gather visible and non-visible light from a plasma plume of a zinc coated metal welding process, wherein the metal is at least one of a steel and an iron;

an optical filter connected to the focusing lens and configured to filter the visible and non-visible light from the plasma plume to produce a spectral region of interest, wherein the spectral region is a multi-directional light spectrum;

a photo detector configured to convert the spectral region of interest into an electrical signal;

a computer configured to analyze at least one spectral line intensity and at least one electron temperature from the spectral region of interest and calculate a ratio of the spectral line intensity of a zinc element of interest in the spectral region of interest with a spectral line intensity of at least one of the steel and the iron, a second element of interest in the spectral region of interest and determine whether a weld in-process is likely to satisfy a set of pre-determined quality standards comprising an upper control limit and a lower control limit; and a feedback control loop operatively coupled to the computer and configured to provide a feedback signal to a welding system in order to alter a welding parameter to maintain a quality weld to meet the set of pre-determined quality standards as compared to the calculated ratio.

* * * * *